United States Patent
Adervall

(10) Patent No.: US 10,310,291 B2
(45) Date of Patent: Jun. 4, 2019

(54) LENS ARRANGEMENT AND A MONITORING CAMERA COMPRISING THE LENS ARRANGEMENT

(71) Applicant: Axis AB, Lund (SE)

(72) Inventor: Mikael Adervall, Klagshamn (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/353,201

(22) Filed: Nov. 16, 2016

(65) Prior Publication Data
US 2017/0139226 A1 May 18, 2017

(30) Foreign Application Priority Data

Nov. 16, 2015 (EP) ..................................... 15194756

(51) Int. Cl.
*G02B 7/02* (2006.01)
*G02B 27/64* (2006.01)
(Continued)

(52) U.S. Cl.
CPC ............. *G02B 27/646* (2013.01); *G02B 7/04* (2013.01); *G03B 3/02* (2013.01); *G03B 17/02* (2013.01);
(Continued)

(58) Field of Classification Search
CPC ........ G02B 27/646; G02B 7/04; G03B 17/02; G03B 17/12; G03B 3/02; H04N 5/2254; H04N 5/2328; H04N 7/183
See application file for complete search history.

(56) References Cited

U.S. PATENT DOCUMENTS

| 632,422 A | 9/1899 | McLaughlin |
| 1,403,768 A | 1/1922 | Griesedieck |

(Continued)

FOREIGN PATENT DOCUMENTS

| CN | 203561784 U | 4/2014 |
| CN | 204101795 U | 1/2015 |

(Continued)

OTHER PUBLICATIONS

Extended European Search Report dated Mar. 2, 2016.
KR 10-2016-0152559 Office Action dated Feb. 21, 2018.

*Primary Examiner* — William Choi
*Assistant Examiner* — Vipin Patel
(74) *Attorney, Agent, or Firm* — Volpe and Koenig, P.C.

(57) ABSTRACT

A lens arrangement for a monitoring camera and a monitoring camera including a lens arrangement is provided. The lens arrangement includes a lens member having a connection portion with an outer thread, an adjustment member having a through hole for receiving the connection portion and an inner thread corresponding to the outer thread, a holder member having a receiving portion for receiving the connection portion and an inner thread corresponding to the outer thread. The lens arrangement is assembled by the connection portion being screwed into the through hole and further into the receiving portion. The receiving portion has a top engagement surface and the adjustment member has a bottom engagement surface. The adjustment member is movable relative to the holder member by screwing between non-engaging and engaging states. In the engaging state, the bottom engagement surface wedgingly engages with the top engagement surface for locking the lens member.

14 Claims, 3 Drawing Sheets

(51) Int. Cl.

| | |
|---|---|
| *G02B 7/04* | (2006.01) |
| *H04N 5/225* | (2006.01) |
| *H04N 5/232* | (2006.01) |
| *H04N 7/18* | (2006.01) |
| *G03B 3/02* | (2006.01) |
| *G03B 17/02* | (2006.01) |
| *G03B 17/12* | (2006.01) |

(52) U.S. Cl.
 CPC .......... *G03B 17/12* (2013.01); *H04N 5/2254* (2013.01); *H04N 5/2328* (2013.01); *H04N 7/183* (2013.01)

(56) References Cited

U.S. PATENT DOCUMENTS

| | | |
|---|---|---|
| 1,779,225 A | 10/1930 | Bausman |
| 3,171,662 A | 3/1965 | Warn |
| 3,515,931 A | 6/1970 | Takakuwa |
| 3,602,532 A | 8/1971 | Ehrenberg |
| 4,289,318 A | 9/1981 | Cather, Jr. et al. |
| 4,425,078 A | 1/1984 | Robbins |
| 4,854,476 A | 8/1989 | Serio, Jr. |
| 6,120,622 A | 9/2000 | Mayr et al. |
| 7,446,964 B2 | 11/2008 | Chang |
| 7,762,559 B2 | 7/2010 | Suzuki et al. |
| 7,773,876 B2 * | 8/2010 | Westerweck ........... G03B 17/02 396/535 |
| 7,857,320 B1 | 12/2010 | Chang |
| 8,059,348 B2 | 11/2011 | Ko |
| 8,107,811 B1 * | 1/2012 | Ma ........................ G03B 17/02 396/535 |
| 8,764,023 B2 | 7/2014 | Furubayashi et al. |
| 2007/0196094 A1 | 8/2007 | Chiang |
| 2010/0066027 A1 | 3/2010 | Vasagar |
| 2011/0096424 A1 | 4/2011 | Lee et al. |
| 2011/0309584 A1 | 12/2011 | Lavery et al. |
| 2012/0014688 A1 | 1/2012 | Ma |
| 2015/0316741 A1 | 11/2015 | Kim et al. |

FOREIGN PATENT DOCUMENTS

| | | |
|---|---|---|
| EP | 1174748 A2 | 1/2002 |
| JP | 11-311334 A | 11/1999 |
| JP | 2009-265131 A | 11/2009 |
| KR | 2008-0110682 A | 12/2008 |
| KR | 100888925 B1 | 3/2009 |
| KR | 10-1346909 B1 | 1/2014 |
| KR | 10-1403992 B1 | 6/2014 |
| WO | 2014/175515 A1 | 10/2014 |

* cited by examiner

LENS ARRANGEMENT AND A MONITORING CAMERA COMPRISING THE LENS ARRANGEMENT

FIELD OF INVENTION

The invention relates to a lens arrangement and a monitoring camera comprising such a lens arrangement.

BACKGROUND

Monitoring cameras such as network cameras may be used in many different situations, both indoors and outdoors, to monitor a scene. The versatility of monitoring cameras has led to an increased demand for cost effective production of monitoring cameras. To meet this demand, it is desirable to reduce, not only the cost of the components of the monitoring cameras, but also the costs associated with the assembly of them.

A monitoring camera comprises a plurality of components such as a housing, a lens arrangement and an image sensor as well as support structures for securing components within the monitoring camera. The assembly of the monitoring camera therefore requires a plurality of steps which may be complicated, time consuming and costly. Furthermore, the assembly requires high precision. Small deviations in the relative position of the components within the monitoring camera may for example lead to misalignment reducing performance of the monitoring camera. Proper alignment of the optical components of the monitoring camera is especially critical as a small deviation may significantly reduce the image quality achieved by the monitoring camera.

It is further desirable to increase the robustness and the durability of the monitoring cameras. To this end, it is desirable to find solutions for reducing problems associated with vibrations and other changes in the environment of the monitoring camera which may degrade its performance before, during or after the installation of the monitoring camera at a scene.

SUMMARY

It is an object of the present invention to provide a lens arrangement mitigating at least some of the problems disclosed above. It is an object of the present invention to further provide a lens arrangement allowing for improved arrangement and positioning of a lens member in a holder member. A further object is for the lens arrangement to allow for improved locking and alignment of the lens member relative to the holder member. According to a first aspect of the invention, this and other objects that will be evident from the following description are achieved by providing a lens arrangement for a monitoring camera, the lens arrangement comprising: a lens member having a connection portion provided with an outer thread, an adjustment member having a through hole for receiving the connection portion and being provided with an inner thread corresponding to the outer thread, a holder member having a receiving portion for receiving the connection portion and being provided with an inner thread corresponding to the outer thread, wherein the lens arrangement is assembled by the connection portion of the lens member being screwed into the through hole of the adjustment member and further into the receiving portion of the holder member, wherein the receiving portion of the holder member has a top engagement surface and the adjustment member has a bottom engagement surface, wherein the adjustment member is movable relative the holder member by screwing between a non-engaging state and an engaging state of the lens arrangement in which engaging state the bottom engagement surface of the adjustment member wedgingly engages with the top engagement surface of the receiving portion of the holder member for locking the lens member.

A cost effective assembly of the lens arrangement is thereby provided. An advantage of the lens arrangement is further that it allows the lens member to be efficiently locked in a desired position relative to the holder member in the engaging state.

The wedged engagement of the bottom engagement surface of the adjustment member with the top engagement surface of the receiving portion of the holder member centres and aligns the lens member relative to the holder member. An alignment of an optical axis of the lens member relative to the holder member is thereby achieved. Problems associated with misalignment of the lens member relative to the holder member are further mitigated.

The wedged engagement of the bottom engagement surface of the adjustment member with the top engagement surface of the receiving portion of the holder member locks the lens member in an axial direction. A relative movement of the adjustment member and the holder member is thereby reduced along the axial direction.

The optical axis of the lens arrangement may be parallel to the axial direction.

The wedged engagement of the bottom engagement surface of the adjustment member with the top engagement surface of the receiving portion of the holder member further locks the position of the lens member in a horizontal plane by radial forces. A relative movement of the adjustment member and the holder member is thereby reduced in the horizontal plane.

The bottom engagement surface of the adjustment member and the top engagement surface of the receiving portion may have or comprise a ring or a ring-like segment. The radial forces are thereby more uniformly distributed around the lens member and an improved centring of the lens arrangement is achieved. A simple adjustment of the position of the lens member relative to the holder member is further provided in the non-engaging state. The lens arrangement allows the lens member to be displaced and locked at a given position along the axial direction.

The lens member may comprise a lens and a structure for supporting the lens.

The lens may be a lens having a fixed focus.

The wording "wedgingly engage" should be understood as a mating of two engagement surfaces of two elements being brought together along an axis, wherein the engagement surfaces are inclined relative said axis. "Wedgingly engage" may alternatively be phrased as a wedged or wedge like engagement. Each of the two elements may be annular in shape, and thus the first element may comprise an annular protrusion having a wedge shaped cross section, which annular protrusion is received by the second element comprising an annular recess having a corresponding wedge shaped cross section. The wedge shaped cross sections of the protrusion and the recess thus allow for an aligned engagement of the first and the second element. The wedge like engagement may also be used for conversion of axial forces pressing the two elements against each other to radial forces, which as has been described above may be used for reduction of movements in the horizontal plane.

The receiving portion may comprise a frustoconical seat forming the top engagement surface of the receiving portion of the holder member, and the adjustment member having a frustoconical protrusion forming the bottom engagement surface of the adjustment member. The frustoconical seat is thereby adapted to receive the frustoconical protrusion such that a wedged engagement is achieved. An efficient wedged engagement may thereby be achieved.

Alternatively, the adjustment member may comprise a frustoconical seat forming the bottom engagement surface, and the receiving portion having a frustoconical protrusion forming the top engagement surface of the receiving portion of the holder member. An alternative structure allowing for efficient wedged engagement may thereby be achieved.

The lens arrangement may further comprise a biasing member arranged at a bottom side of the holder member, and adapted to engage the lens member in an assembled state of the lens arrangement for biasing the lens member in an axial direction thereof. The biasing member may exert a force on the lens member in the axial direction of the lens arrangement pressing surfaces of the inner and outer threads together. The biasing member thereby mitigates play between the inner and outer threads. The lens member is as a result secured in position such that a displacement of the lens member relative to the adjustment member and the holder member is counteracted.

The biasing member may comprise an elastic gasket. A resilient biasing member is thereby provided which may as a response to a compression exert a force in the axial direction on the lens member. The force may be anti-parallel to the direction of the compression.

The elastic gasket may have a cross-section having a z-shape.

The elastic gasket having a z-shape should be understood as the gasket having a shape resembling the letter z, i.e. having a top portion and a bottom portion connected by a mid-portion. The top portion and the bottom portion are typically parallel, but may in some embodiments be skew relative to each other. The angle formed between the top or bottom portion and the mid portion may have different values. The angle may, for example, range between 90 and 45 degrees. The angle may further change when the elastic gasket is subjected to a load. The angle may become smaller as a result of a load being exerted on the elastic gasket. A larger load may further reduce the angle. The z-shape of the elastic gasket may, for example, in at least an unloaded state, comprise two right angled portions, i.e. each portion being formed as a step having a top surface and a side surface that are perpendicular.

The z-shaped gasket may be used for other applications not comprising the lens arrangement described above.

The elastic gasket may comprise a silicone rubber.

A robust and durable elastic gasket may thereby be provided in a cost effective way. The elastic gasket may for example be formed by moulding.

The biasing member may be arranged in contact with the lens member and the holder member for forming an environmental seal. The elastic gasket thereby acts as a protecting layer preventing contaminants from entering into the interior of the biasing member. The contaminants may, for example, be debris formed by the interaction of the inner and outer threads during the relative motion of the lens member and the adjustment member or of the lens member and the holder member.

The biasing member may have an annular shape. A free line of sight through the biasing member may further be achieved.

The holder member may comprise an opening at a bottom side thereof, providing a free line of sight between the lens member and an image sensor being arranged in the vicinity of the bottom side.

The holder member may alternatively comprise the image sensor.

According to a second aspect of the invention, a monitoring camera comprising the lens arrangement described above is provided.

The monitoring camera may be a digital camera providing video sequences. The function and benefits of the monitoring camera device are described above in relation to the lens arrangement. The above mentioned features, when applicable, apply to this second aspect as well. It is noted that the invention relates to all possible combinations of features recited in the claims.

BRIEF DESCRIPTION OF THE DRAWINGS

These and other aspects of the present invention will now be described in more detail, with reference to the appended drawings showing embodiments of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION OF THE PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
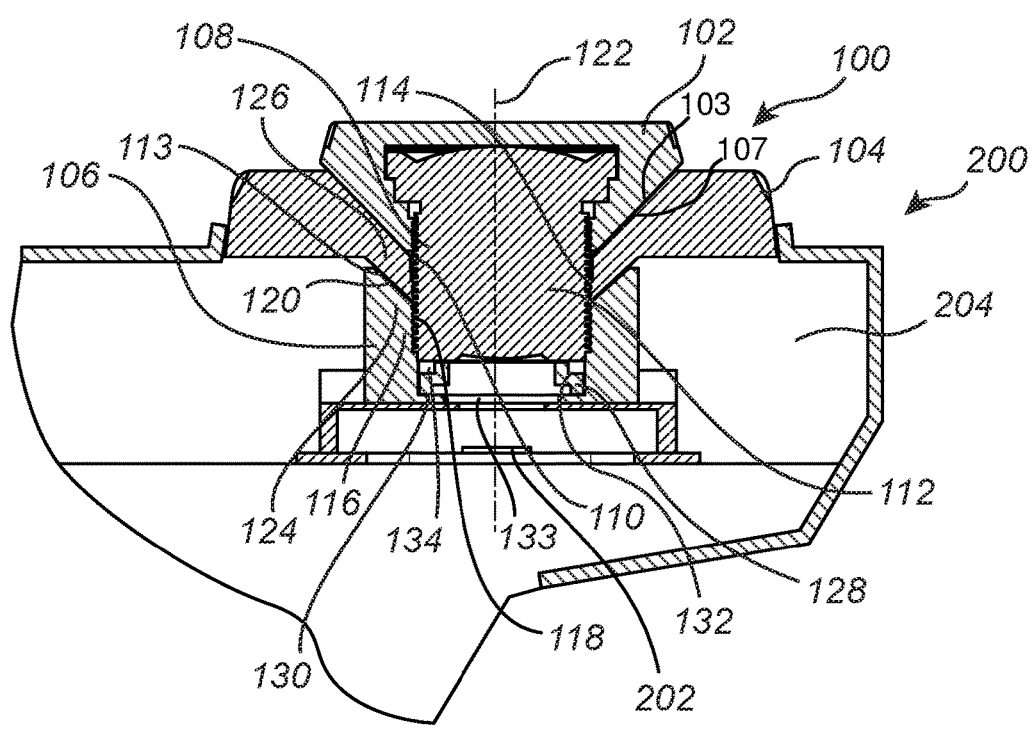
FIG. 1 illustrates a cross-sectional side view of a lens arrangement arranged in a monitoring camera according to one embodiment of the present invention.

A lens arrangement which may be arranged in a monitoring camera is in the following described with reference to FIGS. 1 and 2. FIG. 1 illustrates a cross-sectional side view of the lens arrangement 100. For improved clarity components of the lens arrangement 100 are illustrated in FIGS. 2a and 2b as exploded and assembled perspective side views, respectively.

The lens arrangement 100 is in FIG. 1 further illustrated to be arranged in an assembled state in a monitoring camera 200. The monitoring camera 200 moreover comprises an image sensor 202 and a housing 204. The lens arrangement 100 is further arranged to distribute and focus light from a scene onto the image sensor 202 such that an image of the scene may be provided by the image sensor 202. The image obtained by the image sensor 202 may form part of a video sequence recorded by the monitoring camera 200.

In the following the structure and function of the lens arrangement 100 is described, i.e. the position and relative movement of the members 102, 104 and 106 is discussed. The lens arrangement 100 comprises a lens member 102, an adjustment member 104 and a holder member 106. The lens member 102 has a connection portion 108 which is provided with an outer thread 110.

The adjustment member 104 has a through hole 112 for receiving the connection portion 108. The connection portion 108 of the lens member 102 and the through hole 112 of the adjustment member 104 has a cylindrical and annular shape, respectively. The through hole 112 is provided with an inner thread 114 corresponding to the outer thread 110. The adjustment member 104 further has a bottom engagement surface 113.

The holder member 106 has a receiving portion 116 for receiving the connection portion 108. The receiving portion 116 has an inner thread 118 corresponding to the outer thread 110 of the connection portion 108. The receiving portion 116 has a top engagement surface 120.

The lens arrangement 100 is assembled by screwing the connection portion 108 of the lens member 102 into the through hole 112 of the adjustment member 104 and further into the receiving portion 116 of the holder member 106. The lens member 102 includes a lower engagement surface 103 and the adjustment member 104 includes an upper engagement surface 107. The lower engagement surface 103 and the upper engagement surface 107 each have a slanted profile, and the lower engagement surface 103 and the upper engagement surface 107 are adapted to engage each other.

In a non-engaging state of the lens arrangement 100, the adjustment member 104 is movable relative to the holder member 106. In the non-engaging state, the lens holder 102 may further be moved in relation to the holder member 106. More specifically, in the non-engaging state the lens member 102 is in an unlocked position relative to the holder member 106. The non-engaging state thereby allows for a displacement of the lens member 102 in an axial direction 122 relative to the holder member 106. The displacement is achieved by screwing the lens member 102 up and down in the holder member 106. The adjustment member 104 may during the displacement follow the lens member 102.

The lens arrangement 100 may be brought in an engaging state by the adjustment member 104 being fastened to the holder member 106. This is achieved by screwing the adjustment member 104 on the lens member 102 tightly against the holder member 106. In the engaging state, engagement between the adjustment member 104 and the holder member 106 exclusively occurs between the bottom engagement surface 113 of the adjustment member 104 wedgingly engaging with the top engagement surface 120 of the receiving portion 116 of the holder member 106 for locking the lens member 102. The bottom engagement surface 113 and the top engagement surface 120 each have slanted, flat, and planar profiles. The position of the lens member 102 relative to the holder member 106 is in the engaging state locked by the tightening of the adjustment member 104 to the holder member 106. More specifically, in the engaging state the lens member 102 is fixed in a locked position in the axial direction 122 of the lens member 102 relative to the holder member 106. Hence, the lens arrangement 100 allows the lens member 102 to be efficiently locked in a desired position relative to the holder member 106 in the engaging state. To this end, the separation between the lens member 102 and the image sensor 202 may thereby be set to a desired value.

It should be noted that the lens arrangement 100 may again be brought from the engaging state to the non-engaging state by unscrewing the adjustment member 104 from the holder member 106. Hence, the members 104 and 106 may thereby be moved repeatedly between a non-engaging state and an engaging state providing improved adjustment for a user.

The relative movement of the members 102, 104 and 106 is to be understood as a rotating motion.

Figure 2A:
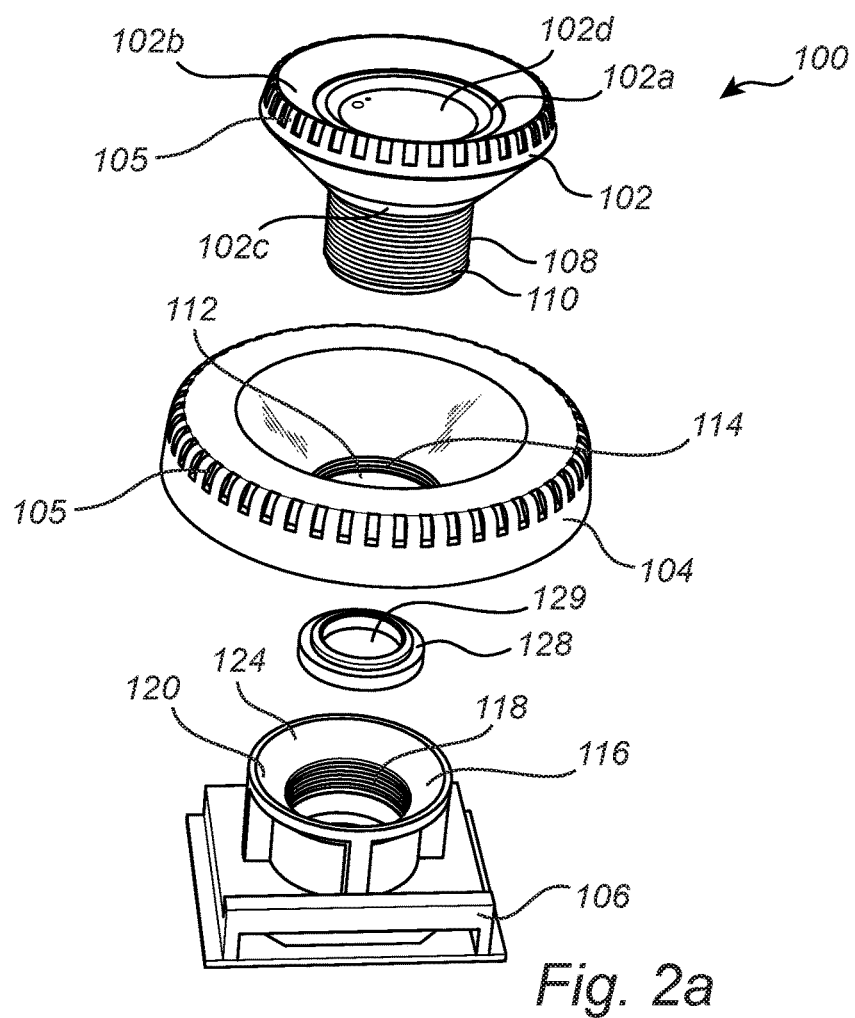
FIGS. 2a and 2b illustrate exploded and assembled perspective side views, respectively, of the lens arrangement of FIG. 1.
Figure 2B:
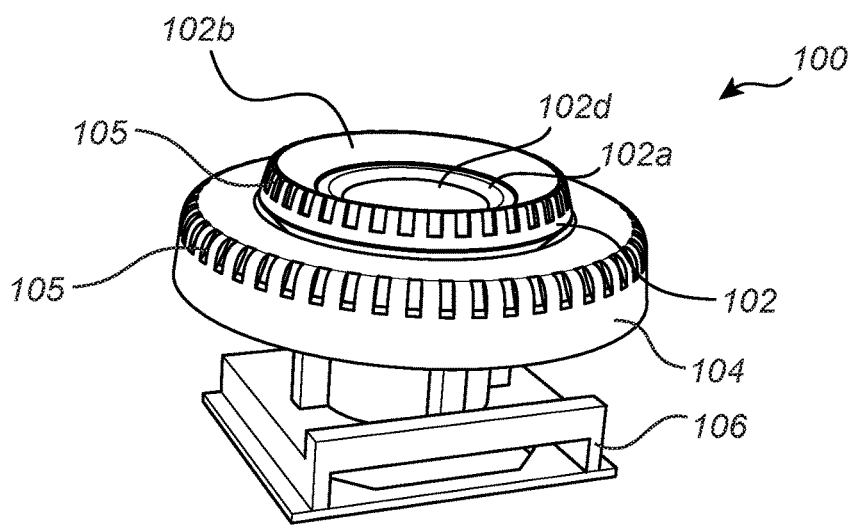

The lens member 102 may further comprise a lens structure 102a, a focusing ring 102b and a lock ring 102c, as illustrated in FIGS. 2a and 2b. The lock ring 102c is adapted to lock the focusing ring 102b to the lens structure 102a. The lens structure 102a comprises an optical lens 102d. In an assembled state of the lens structure 102a the optical lens 102d is further adapted to distribute and focus light received from a monitored scene onto an image detector such as the image sensor 202 of the monitoring camera 200. An image of the scene may thereby be provided by the image sensor 202.

The focusing ring 102b is adapted to improve the handling of the lens member 102 such that the lens member 102 may easily be rotated during the assembly of the lens arrangement 100. The distance between the lens 102d and image sensor 202 may moreover be adjusted more effectively in the non-engaging state by the rotation of the focusing ring 120b i.e., allowing a user to efficiently tune the light distribution and focusing of light onto the image sensor 202. The focusing ring 102b and/or the adjustment member 104 may moreover comprise a corrugation 105 further improving the user's grip when rotating the focusing ring 102b and/or the adjustment member 104.

In the following, the mechanisms for the locking of the position of lens member 102 relative to the holder member 106 in the engaging state are described. The wedged engagement of the bottom engagement surface 113 with the top engagement surface 120 locks the position of the lens member 102 in a horizontal plane by radial forces. The horizontal plane is here considered to be substantially perpendicular to the axial direction 122. The radial forces are provided by the wedged shapes of the receiving portion 116 and the bottom engagement surface 113 of the adjustment member 104. The inner thread 114 of the adjustment member 104 is thereby pressed by inward directed force components towards the lens member 102 as the adjustment member 104 is locked in the engaging state. The downward force exerted on the adjustment member 104 as it is wedgingly engaged in the holder member 106 is therefore mediated to the lens member 102. An effective clamping of the lens member 102 is achieved by the inward force components achieved in the engaging state. It should be noted that the inward force components are according to this embodiment radially directed inward. The inward force components are moreover distributed around the lens member 102 providing an improved centring of the lens member 102 in the lens holder 106.

The wedged engagement of the bottom engagement surface 113 with the top engagement surface 120 further aligns the lens member 102 in relation to the holder member 106. The lens arrangement 100 thereby allows for efficient alignment of the lens member 102 relative to the holder member 106 along the axial direction 122. Problems associated with misalignment of the lens arrangement 100 are thereby mitigated. A cost effective, simplified and precise assembly of the lens arrangement 100 is thereby provided.

According to this embodiment the wedged engagement is achieved by the receiving portion 116 comprising a frustoconical seat 124 forming the top engagement surface 120 of the receiving portion 116 and the adjustment member 104 having a frustoconical protrusion 126 forming the bottom engagement surface 113. The frustoconical protrusion 126 mates with the frustoconical seat 124 allowing for a directed wedged engagement. An outer surface of the frustoconical protrusion 126 is further adapted to be juxtaposed to an inner surface of the frustoconical seat 124 in the engaging state.

The lens arrangement 100 further comprises a biasing member 128. The biasing member 128 is arranged at a bottom side 130 of the holder member 106. The biasing member 128 is an elastic gasket providing resilience such that an outward directed force may be exerted as a response to a compression of the elastic gasket. The compression is achieved when the lens member 102 is screwed into the holder member 106 such that a portion of the lens member 102 is pressed into the biasing member 128. In other words, the biasing member 128 is arranged to engage, in an assembled state of the lens arrangement 100, the lens member 102 such that the lens member 102 is biased in the axial direction 122. The biasing member 128 may thereby exert a force on the lens member 102 in the axial direction 122 pressing surfaces of the inner 114, 118 and outer 110 threads together. Play between the inner 114, 118 and the outer thread 110 is thereby reduced. Displacements in the axial direction 122 of the lens member 102 relative to the holder member 106 are thereby mitigated.

It is advantageous that the elastic gasket has a cross-section having a z-shape, as illustrated in the FIG. 1. It is further advantageous that the biasing member 128 has an annular shape such that the biasing member 128 may surround the lens member 102. An environmental seal 132 may thereby be formed in a simple and effective manner. The environmental seal 132 is formed when the biasing member 128 is in contact with the lens member 102 and the holder member 106. The environmental seal 132 may prevent contaminants from entering into the interior of the biasing member 128, i.e. through the opening 129 of the annular biasing member 128. The contaminants may, for example, be debris formed by the interaction of the inner 114, 118 and outer threads 110 during the relative motion of the lens member 102 and the adjustment member 104 or of the lens member 102 and the holder member 106.

The z-shape of the elastic gasket further provides a cavity 134 in between the biasing member 128, the holder member 106 and the lens member 102. The cavity 134 may be ring-shaped. The cavity 134 may collect debris or dust particles reducing risk of such contaminants penetrating through or in under the elastic gasket.

Figure 3A:
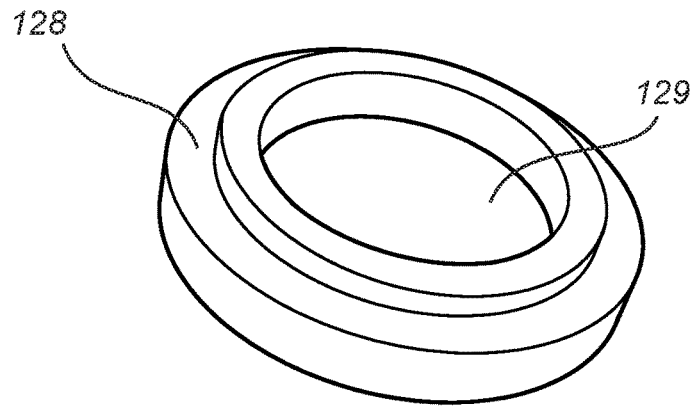
FIG. 3a illustrates a biasing member in a perspective side view according to one embodiment of the present invention.

The elastic properties of the biasing member 128 in the form of an elastic gasket having a z-shaped cross section will now be described with reference to FIGS. 3a-3c. In FIG. 3a the biasing member 128 is illustrated in a perspective side view according to one embodiment of the present invention. The biasing member 128 is formed by an elastic gasket having an annular form and a cross section of a shape resembling the letter z. It should be noted that the z-shaped cross section is tilted, such that the top portion and a bottom portion form an outermost portion 302 and an innermost portion 304, respectively, connected by a mid-portion 303. In an unloaded state of the biasing member, the outermost portion 302 and the innermost portion 304 may have an essentially vertical or axial extension and the mid portion 303 may have an essentially horizontal or radial extension.

Figure 3B:
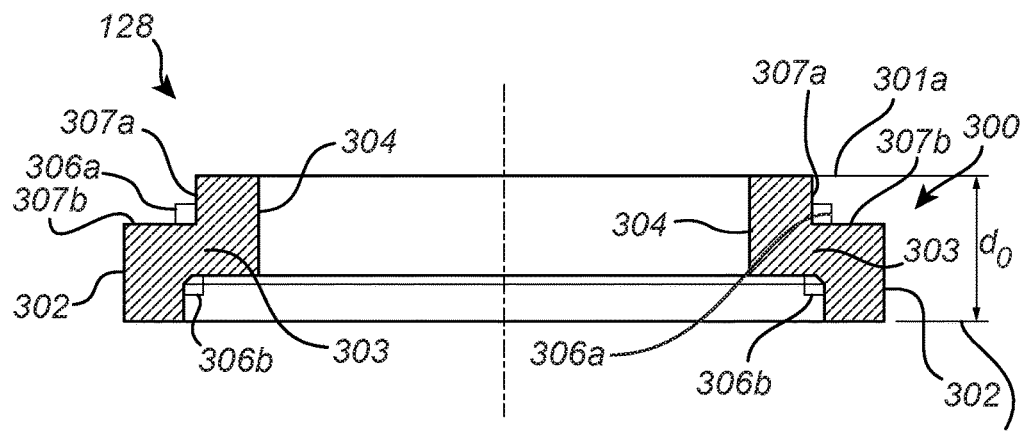
FIGS. 3b and 3c illustrate a cross-sectional side view of the same biasing member as in FIG. 3a in an unloaded state and a loaded state respectively.
Figure 3C:
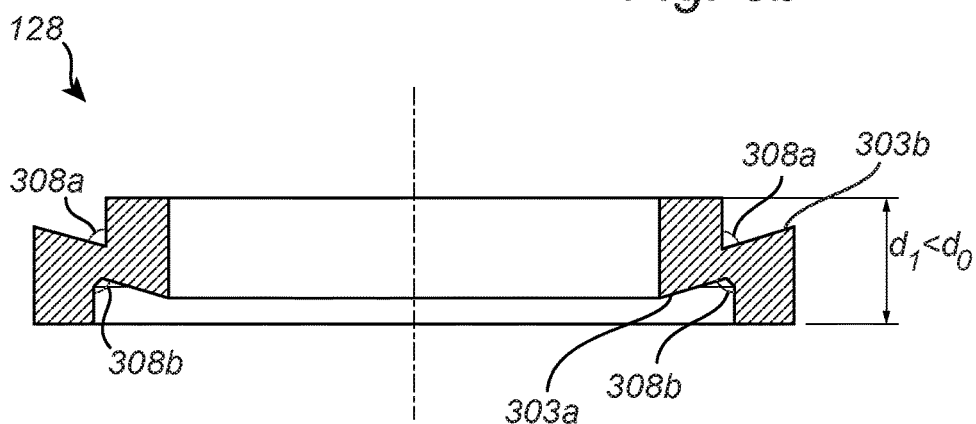

More specifically, the elastic gasket has a cross-section with a z-shape 300, as illustrated in FIGS. 3b and 3c. In FIG. 3b a cross-sectional side view of the z-shaped elastic gasket is shown. The elastic gasket is arranged in between a top surface 301a and a bottom surface 301b and is in an unloaded state. In other words, the surfaces 301a and 301b are separated a distance $d_0$ from each other such that substantially no force is exerted on the biasing member 128. In this unloaded state the outermost portion 302 and the innermost portion 304 of the elastic gasket are substantially parallel relative to each other and the mid portion 303 extends substantially parallel to the surfaces 301a and 301b. Hence, the z-shape of the elastic gasket comprises two right angles 306a and 306b such that the elastic gasket is formed as a step having a top surface 307a and a side surface 307b that are substantially perpendicular relative to each other.

FIG. 3c illustrates the same elastic gasket but in a loaded state, i.e. the surfaces 301a and 301b are instead separated a distance $d_1$, smaller than $d_0$, from each other such that that a force is exerted on the elastic gasket. As a result the shape of the elastic gasket is changed. The inner portion of the elastic gasket may be described to bend such that the inner end 303a of the mid portion 303 drops in height relative to the outer end 303b of the mid portion 303. In other words, the elastic gasket is compressed in a direction perpendicular to the surfaces 301a and 301b. Hence, the step like shape of the elastic gasket is transformed into a more pronounced z-shape, the z-shape comprising two angles 308a and 308b which are smaller than angles formed by the two right angles 306a and 306b. The angles 308a and 308b may further become smaller as a result of an increased load being exerted on the elastic gasket. The elastic gasket may thereby provide resilience to the load such that an axially directed force may be exerted as a response to a compression of the elastic gasket. The z-shape further provides a response to compression such that the axially directed force may be linear over a distance interval, i.e. the z-shape provides a linear response range for the elastic gasket. The top surface 301a may for example be a portion of the lens member 102 which is pressed into the biasing member 128 as the lens member 102 is screwed into the holder member 106 and the bottom surface 301b may be the bottom side 130 of the holder member 106 as illustrated in FIG. 1. The biasing member 128 may thereby exert a linear force on the lens member 102 in the axial direction 122 pressing surfaces of the inner 114, 118 and outer 110 threads together. Play between the inner 114, 118 and the outer threads 110 are thereby reduced. Displacements in the axial direction of the lens member 102 relative to the holder member 106 are thereby mitigated.

The compressibility and linear response of the z-shaped elastic gasket may further improve tuning of the distance between the lens member 102 and the holder member 106. More specifically, the z-shaped elastic gasket may provide a linear response range in which the separation of the lens member 102 to the holder member 106 may be adjusted with a given resistance in the non-engaging state. A more precise adjustment of the lens member 102 relative to the holder member 106 may thereby be provided.

In the linear response range, the adjustment of the location of the lens member 102 relative to the holder member 106 further allows for effective focusing and refocusing of light from a monitoring scene onto to the image sensor. In other words, the tuning of the light distribution and focusing of light received from a monitoring scene onto the image sensor 202 may, moreover, be adjusted more effectively by the linear tuning of the distance between the lens 102d and the image sensor 202. The linear response range may cover a given variation of the back focal length of the optical lens 102d. The linear response range may for example be ±1 mm, preferably 0.25 mm. Hence, the location of the lens member 102 relative to the holder member 106 may be tuned linearly over these ranges. The skilled person in the art realizes that the range over which the axially directed force is linear may differ from the values given above. The linear response range may, for example, depend on the dimensions or the material of the elastic gasket.

It should be noted that the z-shaped gasket may be used for other applications not comprising the lens arrangement described above.

The person skilled in the art realizes that the present invention by no means is limited to the preferred embodiments described above. On the contrary, many modifications and variations are possible within the scope of the appended claims.

For example, the monitoring camera may be a digital camera providing video sequences.

The elastic gasket may comprise a silicone rubber. A robust and durable elastic gasket may thereby be provided in a cost effective way. The elastic gasket may for example be formed by moulding.

The adjustment member may comprise a frustoconical seat forming the bottom engagement surface, and the receiving portion having a frustoconical protrusion forming the top engagement surface of the receiving portion of the holder member.

The axial direction may be the optical axis of the lens arrangement.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A lens arrangement for a monitoring camera, the lens arrangement comprising:
    a lens member having a connection portion provided with an outer thread,
    a single-piece adjustment member having a through hole for receiving the connection portion and being provided with an inner thread corresponding to the outer thread, and
    a holder member having a receiving portion for receiving the connection portion and being provided with an inner thread corresponding to the outer thread,
    wherein the lens arrangement is assembled by the connection portion of the lens member being screwed into the through hole of the single-piece adjustment member and further into the receiving portion of the holder member,
    wherein the receiving portion of the holder member has a top engagement surface and the single-piece adjustment member has a bottom engagement surface, the top engagement surface and the bottom engagement surface each having flat, slanted, and planar profiles,
    wherein the single-piece adjustment member is movable relative the holder member by screwing between a non-engaging state and an engaging state of the lens arrangement, and
    in the engaging state, engagement between the single-piece adjustment member and the holder member exclusively occurs between planar contact of the bottom engagement surface of the single-piece adjustment member wedgingly engaging with the top engagement surface of the receiving portion of the holder member for locking the lens member.

2. The lens arrangement according to claim 1, wherein the receiving portion comprises a frustoconical seat forming the top engagement surface of the receiving portion of the holder member, and the single-piece adjustment member having a frustoconical protrusion forming the bottom engagement surface of the single-piece adjustment member.

3. The lens arrangement according to claim 1, wherein the single-piece adjustment member comprises a frustoconical seat forming the bottom engagement surface, and the receiving portion having a frustoconical protrusion forming the top engagement surface of the receiving portion of the holder member.

4. The lens arrangement according to claim 1, further comprising a biasing member arranged at a bottom side of the holder member, and adapted to engage the lens member in an assembled state of the lens arrangement for biasing the lens member in an axial direction thereof.

5. The lens arrangement according to claim 4, wherein the biasing member comprises an elastic gasket.

6. The lens arrangement according to claim 5, wherein the elastic gasket has a cross-section having a z-shape.

7. The lens arrangement according to claim 5, wherein the elastic gasket comprises a silicone rubber.

8. The lens arrangement according to claim 5, wherein the biasing member is arranged in contact with the lens member and the holder member for forming an environmental seal.

9. The lens arrangement according to claim 5, wherein the biasing member has an annular shape.

10. The lens arrangement according to claim 1, wherein the holder member comprises an opening at a bottom side thereof, providing a free line of sight between the lens member and an image sensor being arranged in the vicinity of the bottom side.

11. A monitoring camera comprising the lens arrangement according to claim 1.

12. The lens arrangement according to claim 1, wherein the lens member includes a lower engagement surface and the single-piece adjustment member includes an upper engagement surface, and the lower engagement surface and the upper engagement surface each have a slanted profile and are adapted to engage each other.

13. The lens arrangement according to claim 1, wherein the bottom engagement surface of the adjustment member extends to the inner thread of the through hole of the adjustment member.

14. The lens arrangement according to claim 1, wherein the top engagement surface of the holder member extends to the inner thread of the holder member.

* * * * *